L. B. JONES.
STUMP PULLER.
APPLICATION FILED MAR. 30, 1917.
1,253,183.
Patented Jan. 8, 1918.
2 SHEETS—SHEET 1.
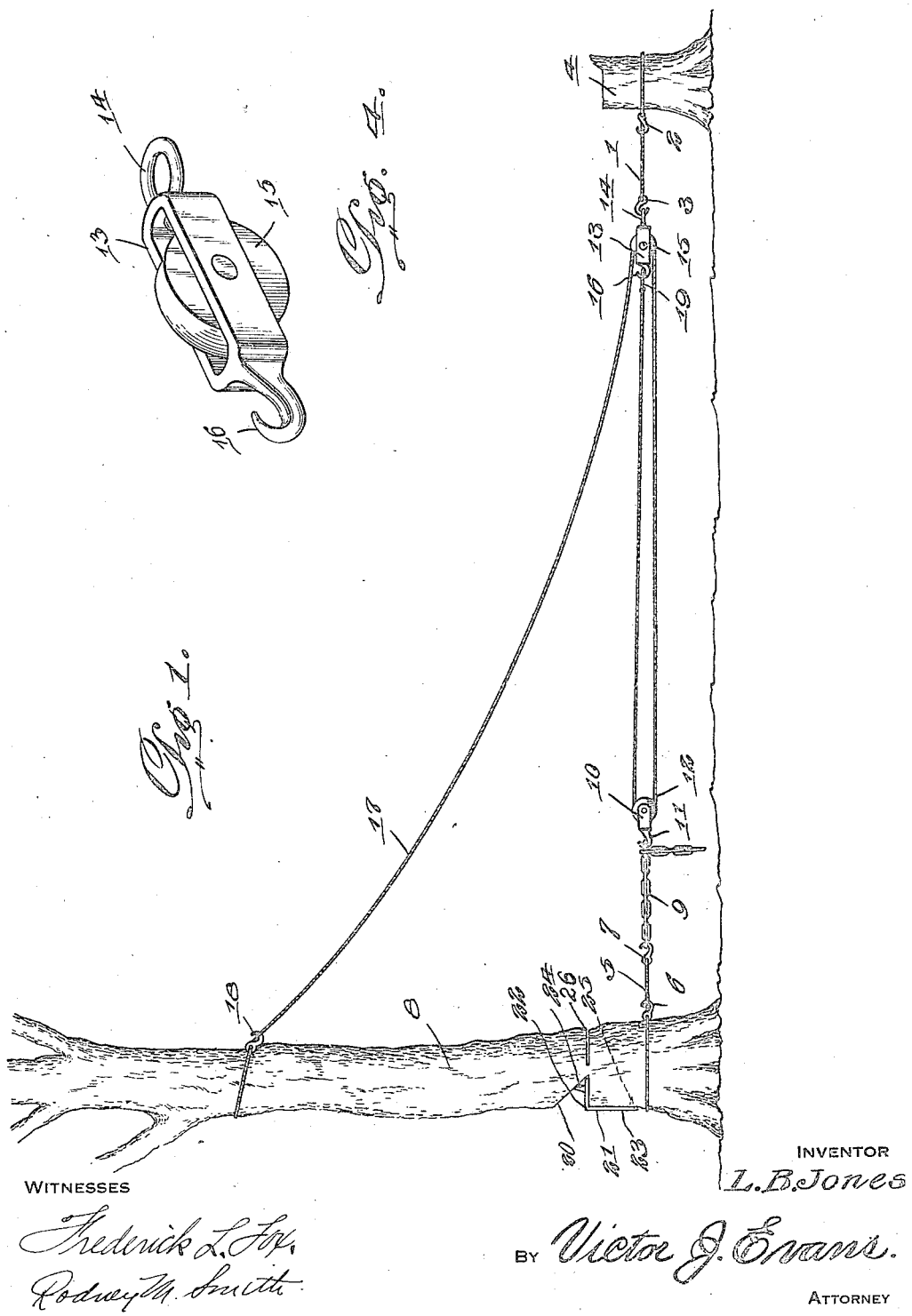
WITNESSES
INVENTOR
L. B. Jones
BY Victor J. Evans
ATTORNEY

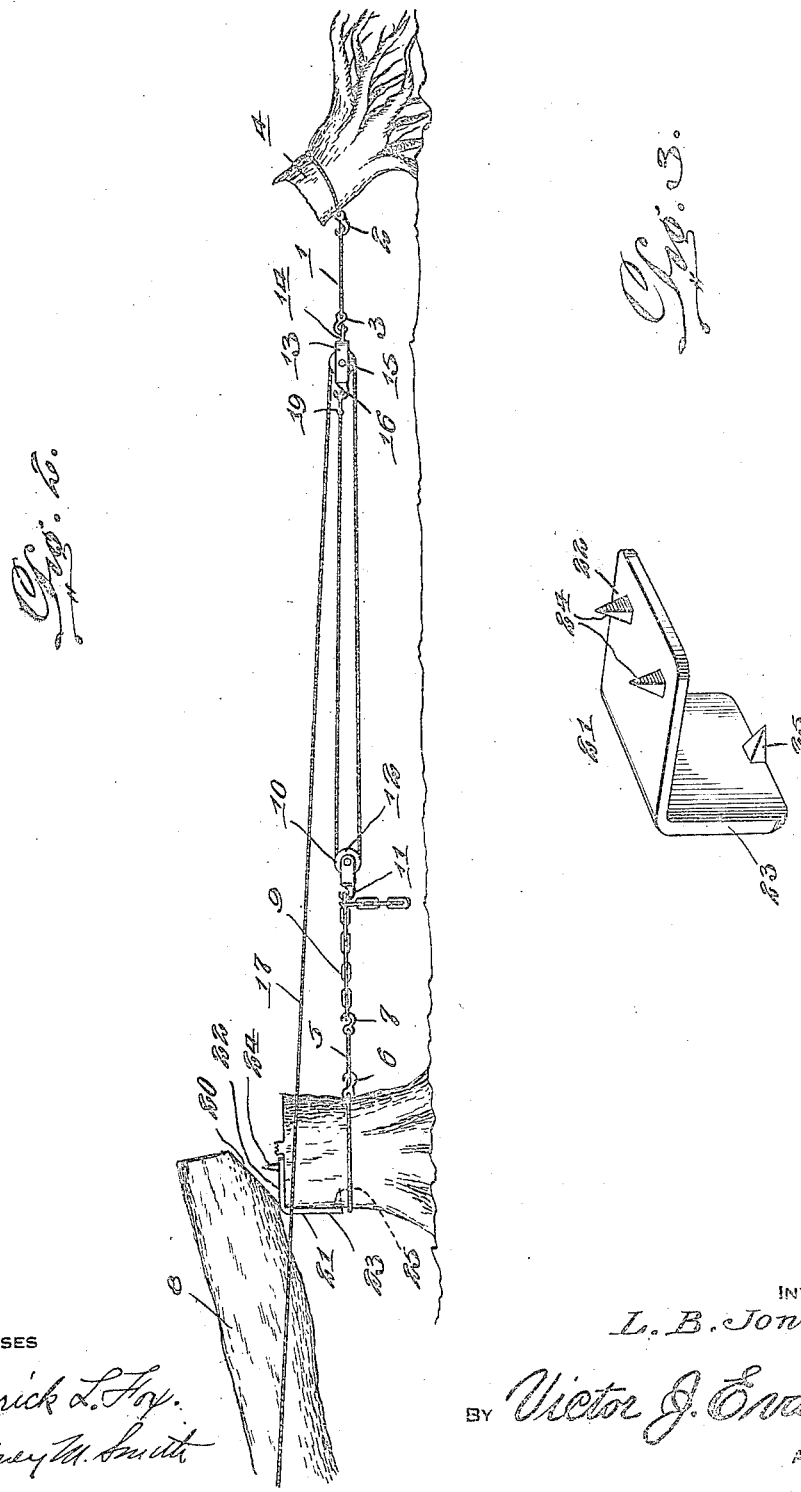

UNITED STATES PATENT OFFICE.

LESLIE B. JONES, OF NEWPORT, WASHINGTON.

STUMP-PULLER.

1,253,183. Specification of Letters Patent. Patented Jan. 8, 1918.

Application filed March 30, 1917. Serial No. 158,635.

*To all whom it may concern:*

Be it known that I, LESLIE B. JONES, a native-born citizen of the United States, residing at Newport, in the county of Pend Oreille and State of Washington, have invented new and useful Improvements in Stump-Pullers, of which the following is a specification.

This invention relates to a method and apparatus for pulling stumps and has for one of its objects the provision of a simple and practical way of extracting stumps of trees by the use of the energy created by the felling of a tree to which a stump is attached.

When using my method, a block having a single pulley is attached to the stump to be pulled, a second block having a single pulley is attached to a tree near its base, a cable is then fixed at one end to the first block past around the pulley of the second block, back around the pulley of the first block and attached at its other end to the tree a considerable distance above the base thereof. The tree is then felled in a direction away from the stump and in falling exerts a tremendous pull on the cable which will extract the stump.

The invention aims to provide in connection with my apparatus, a catch or pivot block which will prevent the base of the cut off portion of the tree sliding toward the stump.

The invention also aims to generally improve stump pulling methods, to render them more practical, economical and satisfactory.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation showing my apparatus connected to a stump and to a tree about to be felled.

Fig. 2 is a similar view showing the provision of the stump and of the tree after the latter has been felled.

Fig. 3 is a perspective view of the catch or pivot block, and

Fig. 4 is a perspective view of the block having the main cable attaching hook.

Referring in detail to the drawings by numerals, 1 designates the stump cable having a hook 2 on one end thereof and a hook 3 on the other end. The cable is attached to the stump 4 which is to be pulled by being passed around the stump and through the hook 2.

A second cable 5 having a hook 6 on one end and a hook 7 on the other end is connected to a tree 8 which when felled will pull the stump 4.

A chain 9 having relatively large links is connected to the cable 5 by means of the hooks 7 and is connected to a block 10 by the hook 11 of the block. The block is of common construction having a body with the hook 11 thereof and a pulley 12 in its other end.

A second block 13 having a swivel hook 14 in one end thereof is secured to the cable 1 by means of the hook 3. This block 13 carries a single pulley 15 and is formed with a hook 16 on one end thereof.

A main cable 17 is passed at one end around the tree 8 at a considerable distance above its base and is secured thereto by the hook 18. The cable is then passed around the pulley 15, then the pulley 12, and is secured by means of the terminal loop 19 to the hook 16 of the block 13. The cable is adjusted by varying the point of attachment of the hook 11 to the chain 9 so that a little slack of about five feet for instance, is left in the cable between the tree and the block 13.

An under cut notch 20 is made in the tree 8 on the side farthest removed from the stump to cause the upper portion of the tree to which the main cable 17 is attached to fall away from the stump. The energy of the falling tree will exert a tremendous jerking and pulling action on the main cable which will be sufficient to pull the stump 4 from the ground.

To prevent the butt of the upper portion of the tree siding toward the stump, I employ an angular catch or pivot block 21 having the horizontal section 22 and the vertical section 23. This block is secured on the tree 8 with its horizontal section 22 lying on the upturned face of the notch 20 and its vertical section 23 lying against the side of the tree. Spurs or prongs 24 are formed adjacent the free inner edge of the section 22 of the block intermediate its ends and catches in the inclined face of the notch 20. A second spur or prong 25 is formed on the inner side of the vertical section 23 of the stump block intermediate its ends and is driven into the base of the tree. Now when the upper part of the tree falls, the spurs 24 will act as a pivot and prevent the base of the cut away portion of the tree moving toward the stump 4. The tree may be caused to fall in the proper direction by driving a wedge into the saw-cut 26.

From the foregoing description taken in connection with the accompanying drawings, it will be seen that I have provided a practical, economical and satisfactory method of extracting stumps and that I have devised an efficient apparatus for putting my method into practice.

While I have shown and described the preferred embodiments of my invention, it will be clearly understood that I do not wish to be limited to this construction, but may make such changes as will fall within the scope and spirit of the invention as claimed.

What I claim is:—

The herein described method of extracting stumps, consisting in connecting the stump to be pulled to the base of a tree with a power multiplying connection, connecting the draw of such power multiplying connection to the tree above the base, and felling the tree from the stump and by a line of cut above the power multiplying connection to the base.

In testimony whereof I affix my signature.

LESLIE B. JONES.

Copies of this patent may be obtained for five cents each, by addressing the "Commissioner of Patents, Washington, D. C."